US009590239B2

(12) United States Patent
Abe et al.

(10) Patent No.: US 9,590,239 B2
(45) Date of Patent: Mar. 7, 2017

(54) NEGATIVE ELECTRODE FOR NONAQUEOUS SECONDARY BATTERY, METHOD FOR PRODUCING THE SAME, AND NONAQUEOUS SECONDARY BATTERY

(71) Applicant: KABUSHIKI KAISHA TOYOTA JIDOSHOKKI, Kariya-shi, Aichi-ken (JP)

(72) Inventors: Tomokuni Abe, Kariya (JP); Hiroki Oshima, Kariya (JP); Yuya Sato, Kariya (JP); Kisena Yoshida, Kariya (JP); Nobuhiro Goda, Kariya (JP); Manabu Miyoshi, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 326 days.

(21) Appl. No.: 14/179,068

(22) Filed: Feb. 12, 2014

(65) Prior Publication Data
US 2014/0242458 A1    Aug. 28, 2014

(30) Foreign Application Priority Data
Feb. 25, 2013    (JP) .................................. 2013-034846

(51) Int. Cl.
*H01M 6/04* (2006.01)
*H01M 4/36* (2006.01)
(Continued)

(52) U.S. Cl.
CPC ......... *H01M 4/366* (2013.01); *H01M 4/0404* (2013.01); *H01M 4/1391* (2013.01);
(Continued)

(58) Field of Classification Search
CPC .. H01M 4/366; H01M 4/0404; H01M 4/1391; H01M 4/602; H01M 4/48; Y02E 60/122; Y02P 70/54
(Continued)

(56) References Cited

U.S. PATENT DOCUMENTS

| 5,395,711 A * | 3/1995 | Tahara .................. H01M 4/485 |
| | | 429/231.3 |
| 2010/0129711 A1* | 5/2010 | Kashiwagi .............. H01M 4/13 |
| | | 429/209 |

(Continued)

FOREIGN PATENT DOCUMENTS

| JP | 08064203 A | 3/1996 |
| JP | 10312803 A | 11/1998 |

(Continued)

OTHER PUBLICATIONS

Communication dated Feb. 5, 2015 from the Japanese Patent Office in counterpart Application No. 2013-034846.

*Primary Examiner* — Gary Harris
(74) *Attorney, Agent, or Firm* — Sughrue Mion, PLLC

(57) ABSTRACT

Provided is a negative electrode for a nonaqueous secondary battery which achieves both suppression of reductive decomposition of an electrolyte or an electrolytic solution and suppression of an increase in resistance. Also provided are a method for producing such a negative electrode and a nonaqueous secondary battery employing such a negative electrode. A polymer coating layer is formed so as to coat at least part of surfaces of negative electrode active material particles containing silicon oxide ($SiO_x$; $0.5 \leq x \leq 1.6$). The polymer coating layer contains a cationic polymer having a positive zeta potential under neutral conditions. Since silicon oxide has a negative zeta potential, a thin uniform coating layer can be formed owing to Coulomb's force.

6 Claims, 1 Drawing Sheet

(51) Int. Cl.
  *H01M 4/04*    (2006.01)
  *H01M 4/1391*  (2010.01)
  *H01M 4/48*    (2010.01)
  *H01M 4/60*    (2006.01)

(52) U.S. Cl.
  CPC ............ *H01M 4/48* (2013.01); *H01M 4/602* (2013.01); *Y02E 60/122* (2013.01); *Y02P 70/54* (2015.11)

(58) Field of Classification Search
  USPC .................................................. 429/200, 211
  See application file for complete search history.

(56) References Cited

U.S. PATENT DOCUMENTS

2010/0196764 A1* 8/2010 Ihara .................... H01M 4/133
                                                                    429/331
2010/0255183 A1* 10/2010 Wu ........................ B82Y 20/00
                                                                    427/58

FOREIGN PATENT DOCUMENTS

| JP | 2004171907  A | 6/2004 |
| JP | 2004-185810 A | 7/2004 |
| JP | 2006216276  A | 8/2006 |
| JP | 2007059264  A | 3/2007 |
| JP | 2009-176703 A | 8/2009 |
| JP | 2010205659  A | 9/2010 |
| WO | 2012029420 A1 | 3/2012 |

* cited by examiner

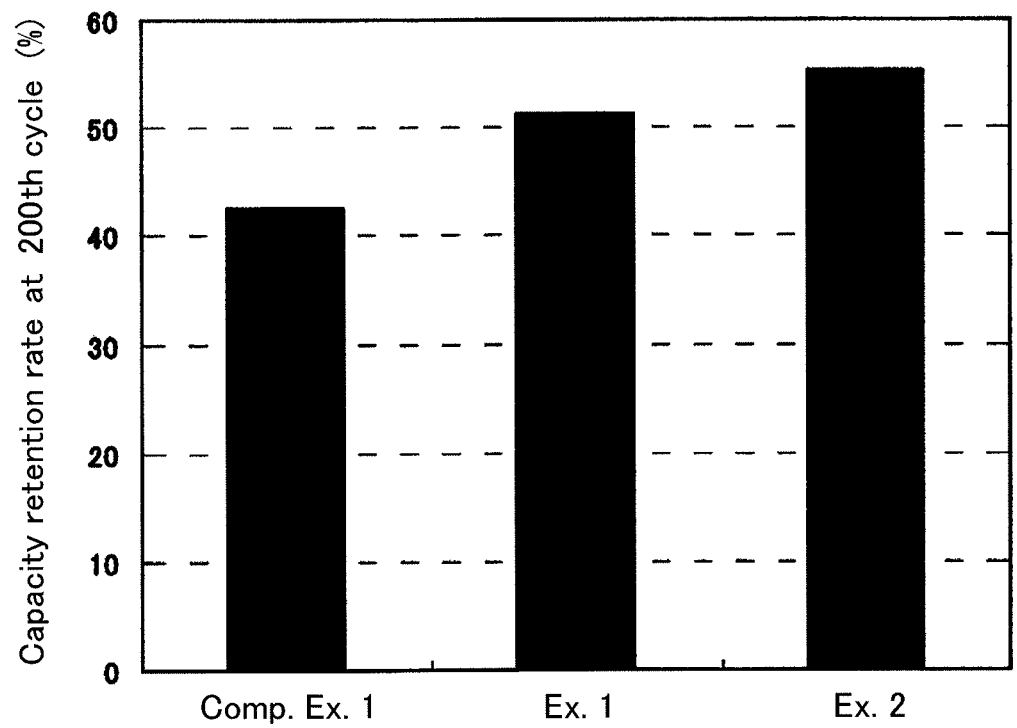

NEGATIVE ELECTRODE FOR NONAQUEOUS SECONDARY BATTERY, METHOD FOR PRODUCING THE SAME, AND NONAQUEOUS SECONDARY BATTERY

TECHNICAL FIELD

The present invention relates to a negative electrode to be used in a nonaqueous secondary battery, and a method for producing the same, and a nonaqueous secondary battery using the negative electrode.

BACKGROUND OF THE INVENTION

Lithium ion secondary batteries are second batteries having high charge and discharge capacity and capable of outputting high power. The lithium ion second batteries are now the dominant power source for portable electronic devices and considered to be a promising power source for electric vehicles to be widely used in future. A lithium ion secondary battery has an active material capable of absorbing and releasing lithium (Li) at each of a positive electrode and a negative electrode. The lithium ion secondary battery works by moving lithium ions in an electrolytic solution provided between the electrodes.

In the lithium ion secondary battery, lithium-containing metal composite oxide such as lithium-cobalt composite oxide is mainly used as an active material for a positive electrode, and a carbon material having a multilayer structure is mainly used as an active material for a negative electrode. Performance of the lithium ion secondary battery depends on raw materials of the positive electrode, the negative electrode, and an electrolyte constituting the secondary battery. Research and development are now actively carried out particularly on raw materials of the active materials. For example, silicon or silicon oxide having a higher capacity than carbon is being studied as a raw material for the negative electrode active material.

A battery having a higher capacity can be obtained by using silicon as the negative electrode active material than by using carbon materials. Silicon, however, has a large volume change associated with Li absorption and release in electric charge and discharge. Therefore, silicon readily changes into fine powder and drops or peels off from a current collector, so there arises a problem that such a battery has a short charge and discharge cycle life. Upon using silicon oxide instead of silicon as the negative electrode active material, volume change associated with Li absorption and release in electric charge and discharge can be suppressed.

For example, use of silicon oxide ($SiO_x$; about $0.5 \leq x \leq 1.6$) as the negative electrode active material is being studied. It is known that when subjected to heat treatment, $SiO_x$ decomposes into Si and $SiO_2$. This is called a disproportionation reaction and $SiO_x$ is separated into two phases of Si phase and $SiO_2$ phase owing to an internal reaction in the solid. The $SiO_2$ obtained by the separation is very fine. In addition, the $SiO_2$ phase covering the Si phase serves to suppress decomposition of an electrolytic solution. Therefore, a secondary battery using $SiO_x$ which has been decomposed into Si and $SiO_2$ as the negative electrode active material has good cycle characteristics.

However, even in the abovementioned lithium ion secondary battery using silicon oxide as the negative electrode active material, expansion and shrinkage of the negative electrode in charge and discharge cannot be avoided, so there is a problem that fatigue breakdown of the negative electrode occurs. Furthermore, in the negative electrode of the lithium ion secondary battery, an electrolyte or an electrolytic solution sometimes undergoes reductive decomposition in charge or discharge, and a precipitate produced by the decomposition may deposit to form a coating film. Such a coating film causes problems such as an increase in resistance and a decrease in load characteristics.

Japanese Unexamined Patent Publication No. 2004-185810 mentions that fatigue breakdown can be prevented by forming a negative electrode by using active material particles whose surfaces are coated with a polymer. Moreover, Japanese Unexamined Patent Publication No. 2009-176703 discloses that drop off of active material particles caused by pressing is prevented by coating a surface of a silicon oxide-containing negative electrode active material layer with a polymer. Since formation of such a polymer coating layer prevents direct contact of a negative electrode active material and an electrolytic solution, the formation is also expected to prevent decomposition of an electrolyte or the electrolyte solution.

However, there is a problem that a too small thickness of the polymer coating layer makes it difficult to exhibit the abovementioned effects, while a great thickness of the polymer coating layer increases resistance. The abovementioned patent documents disclose kneading and spin coating as examples of a method for applying a polymer. However, these coating methods are difficult to control coating film thickness, and as a result are difficult to satisfy paradoxical requests of suppression of reductive decomposition of the electrolyte or the electrolytic solution and suppression of an increase in resistance.

CITATIONS LIST

Patent Literature

[PTL 1] Japanese Unexamined Patent Publication No. 2004-185810

[PTL 2] Japanese Unexamined Patent Publication No. 2009-176703

BRIEF SUMMARY OF THE INVENTION

Technical Problems

The present invention has been made in view of the above circumstances. It is an object of the present invention to provide a negative electrode for a nonaqueous secondary battery which achieves both suppression of reductive decomposition of an electrolyte or an electrolytic solution and suppression of an increase in resistance. It is another object of the present invention to provide a method for producing such a negative electrode. It is still another object of the present invention to provide a nonaqueous secondary battery employing such a negative electrode.

Solution to Problems

A negative electrode for a nonaqueous secondary battery of the present invention, which solves the above-mentioned problems, includes a current collector and a negative electrode active material layer bonded to the current collector, and is characterized in that the negative electrode active material layer includes negative electrode active material particles containing silicon oxide ($SiO_x$; $0.5 \leq x \leq 1.6$) a bonding portion for bonding the negative electrode active material particles with each other and bonding the negative electrode active material particles with the current collector, and a polymer coating layer coating at least part of surfaces of at least the negative electrode active material particles, and the polymer coating layer contains a cationic polymer having a positive zeta potential under neutral conditions.

A method for producing a negative electrode for a non-aqueous secondary battery according to the present invention is characterized by comprising a step of applying a slurry containing negative electrode active material particles containing silicon oxide ($SiO_x$; $0.5 \leq x \leq 1.6$), and a binder to a surface of a current collector and drying the slurry, thereby forming a negative electrode active material layer; and a step of applying a polymer solution of a cationic polymer having a positive zeta potential under neutral conditions in a solvent to the negative electrode active material layer and drying the solution-applied negative electrode active material layer, thereby forming a polymer coating layer.

Advantageous Effects of the Invention

In the negative electrode for a nonaqueous secondary battery according to the present invention, a polymer coating layer is formed on at least part of surfaces of negative electrode active material particles containing silicon oxide ($SiO_x$; $0.5 \leq x \leq 1.6$). Since this polymer coating layer coats the negative electrode active material particles, the negative electrode active material particles and an electrolytic solution can be prevented from directly contacting each other.

The polymer coating layer contains a cationic polymer having a positive zeta potential under neutral conditions. Since silicon oxide ($SiO_x$; $0.5 \leq x \leq 1.6$) has a negative zeta potential of −43.4 in ethanol, the negative electrode active material particles and a cationic polymer layer are firmly bonded to each other by Coulomb's force. Moreover, the cationic polymer layer and an anionic polymer layer are also firmly bonded to each other by Coulomb's force. Therefore, each of the cationic polymer layer and the anionic polymer layer can be formed with a small thickness and the polymer coating layer can have a total thickness on a nanometer order. As a result, a thin uniform polymer coating layer can be formed.

Since the polymer coating layer thus formed and the negative electrode active material particles have a high bond strength, the negative electrode active material particles and the electrolytic solution can be suppressed from directly contacting each other even when a battery is driven under a high voltage. Moreover, since the polymer coating layer has a total thickness on a nanometer order to a submicronmeter order, the polymer coating layer can be suppressed from exhibiting resistance to lithium ion conductivity. Therefore, the electrolytic solution can be suppressed from being decomposed, so it becomes possible to provide a nonaqueous secondary battery which has a high capacity and can maintain high battery characteristics even after repeated charge and discharge.

Furthermore, since the polymer coating layer can be formed by dipping, a roll-to-roll process can be employed and productivity is improved.

BRIEF DESCRIPTION OF THE DRAWING

FIG. 1 is a bar chart showing capacity retention rate after a cycle test.

DETAILED DESCRIPTION OF THE INVENTION

The "zeta potential" mentioned in the present invention is measured by microscopic electrophoresis, rotating diffraction grating, laser Doppler electrophoresis, an ultrasonic vibration potential (UVP) method, or an electrokinetic sonic amplitude (ESA) method. It is especially preferred that "zeta potential" is measured by laser Doppler electrophoresis. (Specific measurement conditions will be described below but zeta potential measurement conditions are not limited to those mentioned below. First, three kinds of solutions (suspensions) each having a solid content of 0.1 wt % were respectively prepared by using ethanol, acetone, and water as solvents. Measurement was performed three times for each solution at a temperature of 25 deg. C. and an average of the measured values of each of the solutions was calculated. With respect to the pH, the solution was put under neutral conditions. The neutral conditions are, for example, about pH 7.

The negative electrode for a nonaqueous secondary battery according to the present invention includes a current collector and a negative electrode active material layer bonded to the current collector. The current collector of the present invention can be those generally employed for lithium ion secondary batteries or the like. Examples of the current collector include aluminum foil, aluminum mesh, punching aluminum sheets, aluminum expanded sheets, stainless steel foil, stainless steel mesh, punching stainless steel sheets, stainless steel expanded sheets, foamed nickel, nickel non-woven fabric, copper foil, copper mesh, punching copper sheets, copper expanded sheets, titanium foil, titanium mesh, carbon non-woven fabric, and carbon woven fabric.

The negative electrode active material layer includes numerous negative electrode active material particles comprising a negative electrode active material, a bonding portion for bonding the negative electrode active material particles with each other and bonding the negative electrode active material particles with the current collector, and a polymer coating layer coating at least part of surfaces of at least the negative electrode active material particles. The negative electrode active material particles contain silicon oxide ($SiO_x$; $0.5 \leq x \leq 1.6$).

Respective particles of silicon oxide comprise SiO which has been decomposed into fine Si, and $SiO_2$ covering Si by a disproportionation reaction. If x is less than the lower limit value, an Si ratio is so high that volume change in charge and discharge is too great and cycle characteristics deteriorate. On the other hand, if x exceeds the upper limit value, the Si ratio is so low that energy density decreases. The range $0.5 \leq x \leq 1.5$ is preferred, and a range $0.7 \leq x \leq 1.2$ is more desired.

It is generally said that almost all SiO undergoes disproportionation to be separated into the two phases at 800 deg. C. or more in an oxygen-free atmosphere. Specifically, silicon oxide powder including two phases of amorphous $SiO_2$ phase and crystalline Si phase can be obtained by applying heat treatment to raw material silicon oxide powder containing amorphous SiO powder at 800 to 1200 deg. C. for 1 to 5 hours in an inert atmosphere such as in vacuum or in an inert gas.

Moreover, a composite of a carbon material and SiO at a mass ratio of 1 to 50:100 can be used as the negative electrode active material. Cycle characteristics can be improved by compounding the carbon material. When the ratio of the carbon material to SiO is less than 1% by mass, an effect to improve electric conductivity cannot be obtained. On the other hand, when the ratio of the carbon material is more than 50% by mass, the ratio of SiO relatively decreases, so negative electrode capacity decreases. The ratio of the carbon material to $SiO_x$ preferably falls in a range of 5 to 30% by mass, and more desirably in a range of 5 to 20% by mass.

It is desired that silicon oxide ($SiO_x$) powder has an average particle size in a range of 1 to 10 μm. If the average particle size is larger than 10 μm, charge and discharge characteristics of a nonaqueous secondary battery deteriorate. On the other hand, if the average particle size is smaller than 1 μm, the particles aggregate to form coarse particles, so sometimes charge and discharge characteristics of a nonaqueous secondary battery similarly deteriorate.

The bonding portion is a portion formed by drying a binder, and bonds the negative electrode active material particles with each other and bonds the negative electrode active material particles with the current collector. Examples of the binder include polyvinylidene difluoride (PVDF), polytetrafluoroethylene (PTFE), styrene-butadiene rubber (SBR), polyimide (PI), polyamide-imide (PAI), calboxymethyl cellulose (CMC), polyvinyl chloride (PVC), acrylic resin, methacrylic resin, polyacrylonitrile (PAN), modified polyphenylene oxide (PPO), polyethylene oxide (PEO), polyethylene (PE), and polypropylene (PP). It is possible to add, singly or in combination, one or more curing agents such as epoxy resin, melamine resin, blocked polyisocyanate, polyoxazoline, and polycarbodiimide, and/or one or more additives such as ethylene glycol, glycerin, polyether polyol, polyester polyol, acryl oligomer, phthalate ester, dimer acid-modified compounds, and polybutadiene-based compounds, as long as these do not impair characteristics of the negative electrode binder.

It is only necessary that the polymer coating layer covers at least part of surfaces of the negative electrode active material particles. However, in order to surely prevent direct contact of the negative electrode active material particles with an electrolytic solution it is preferred that the polymer coating layer covers almost all surfaces of the negative electrode active material particles. It is also desired that the polymer coating layer is formed on at least part of the bonding portion. By doing so, the bonding portion is protected and bond strength is further increased, so the negative electrode active material layer is prevented from cracking or peeling off even after a severe cycle test under high temperature and high voltage. It is also desired that the polymer coating layer is formed on at least part of a conductive assistant. By doing so, the conductive assistant can be protected.

The polymer coating layer contains a cationic polymer having a positive zeta potential under neutral conditions. Examples of the cationic polymer having a positive zeta potential include polyethylene imine, polyallylamine, polyvinyl amine, polyaniline, and polydiallyldimethylammonium chloride. It is possible that the polymer coating layer is only comprised of the cationic polymer, but it is preferred that the polymer coating layer is formed by alternately depositing the cationic polymer and an anionic polymer having a negative zeta potential under neutral conditions. By doing so, a denser polymer coating layer can be formed. Besides, since electric charge of the polymer coating layer comprising the cationic polymer is neutralized, the polymer coating layer comprising the cationic polymer can be prevented from dissolving into an electrolytic solution having a negative electric charge.

Examples of the anionic polymer include polyacrylic acid, sodium polyarylate, polymethacrylic acid, polyvinyl sulfonic acid, polyethylene glycol, polyvinylidene difluoride, polytetrafluoroethylene, and polyacrylonitrile.

Formation of the polymer coating layer can be made by a CVD method or a PVD method, but these methods are not preferred in view of costs. Therefore, in the production method of the present invention, the polymer coating layer is formed by applying a solution of a polymer in a solvent to the negative electrode active material layer and drying the solution-applied negative electrode active material layer.

The solvent of the polymer solution can be an organic solvent or water. The organic solvent used is not particularly limited, and can be a mixture of a plurality of organic solvents. Examples of the organic solvent include alcohols such as methanol, ethanol and propanol; ketones such as acetone, methyl ethyl ketone, and methyl isobutyl ketone; esters such as ethyl acetate and butyl acetate; aromatic hydrocarbons such as benzene and toluene; DMF; n-metyl-2-pyrolidone; and a combination of n-methyl-2-prolidone and ester solvents (ethyl acetate, n-butyl acetate, butyl cellosolve acetate, diethylene glycol n-butyl ether acetate, etc.) or glyme solvents (diglyme, triglyme, tetraglyme, etc.). It is desired to employ a low boiling point solvent which is easily removable from the polymer coating layer.

Application of the polymer solution can be made by spraying, roller coating, brush coating and the like, but dipping is desired in view of uniformly coating the surface of the negative electrode active material. If the application is made by dipping, gaps between the negative electrode active material particles are impregnated with the polymer solution, so a polymer coating layer can be formed on almost all surfaces of the negative electrode active material particles. Therefore, the negative electrode active material and the electrolytic solution can be surely prevented from directly contacting each other.

There are two methods for applying the polymer solution by dipping. In one method, a slurry containing at least a negative electrode active material and a binder is bonded to a current collector, thereby forming a negative electrode. Then the thus formed negative electrode is immersed in a polymer solution, taken out and dried. This operation is repeated, if necessary, thereby forming a polymer coating layer having a predetermined thickness.

In the other method, negative electrode active material powder is first mixed in a polymer solution and then dried by freeze drying or other methods. This operation is repeated, if necessary, thereby forming a polymer coating layer having a predetermined thickness. Then, a negative electrode is formed by using the negative electrode active material having the polymer coating layer.

Polymer concentration in the polymer solution is preferably not less than 0.001% by mass and less than 2.0% by mass, and desirably falls in a range of 0.1 to 0.5% by mass. If the concentration is too low, probability of contact with the negative electrode active material is so low that it takes a longtime to coat the negative electrode active material. If the concentration is too high, the polymer coating layer becomes so thick that resistance may sometimes increase.

Thickness of the polymer coating layer is preferably in a range of 0.1 to 100 nm, more preferably in a range of 0.1 to 10 nm, and particularly desirably in a range of 0.1 to 5 nm. If the thickness of the polymer coating layer is too small, the negative electrode active material may sometimes directly contact the electrolytic solution. On the other hand, if the thickness of the polymer coating layer is on the micrometer order or more, the negative electrode when used in a secondary battery has a high resistance and accordingly a low ion conductivity. A thin uniform polymer coating layer can be formed by preparing the aforementioned dipping solution (the polymer solution) so as to have a low polymer concentration and repeating the coating operation.

It is also preferred that a conductive assistant is contained in the negative electrode active material layer. The conductive assistant is added in order to increase electric conductivity of the electrode. As the conductive assistant, carbon black, graphite and acetylene black (AB) as fine carbonaceous particles, vapor grown carbon fiber (VGCF) and the like can be added singly or in combinations of two or more. The amount of the conductive assistant used is not particularly limited and, for example, can be about 2 to 100 parts by mass with respect to 100 parts by mass of the active material. If the amount of the conductive assistant is less than 2 parts by mass, an efficient conductive path cannot be formed. If the amount of the conductive assistant exceeds 100 parts by mass, shape formability of the electrode deteriorates and energy density lowers.

When silicon oxide ($SiO_x$; $0.5 \leq x \leq 1.6$) used in the negative electrode of the present invention is dispersed in water or an organic solvent which are free from electrolytes, it is known that a measured value of zeta potential is negative. In consideration of this phenomenon, a cationic polymer having a positive zeta potential, such as polyethylene imine, is used. By doing so, the negative electrode active material and the polymer firmly bond each other by Coulomb's force. Furthermore, it is preferred that a second polymer coating layer is formed on a first polymer coating layer comprising a cationic polymer by using an anionic polymer having a negative zeta potential such as polyacrylic acid.

Since the polymer coating layer thus formed has a high bond strength with the negative electrode active material, the negative electrode active material and the electrolytic solution can be suppressed from directly contacting each other. Moreover, if the polymer coating layer has a total thickness on a nanometer order to a submicrometer order, the polymer coating layer is suppressed from exhibiting resistance to ion conductivity. Therefore, it is possible to provide a nonaqueous secondary battery having a high capacity and capable of maintaining high battery characteristics even after repeated charge and discharge.

It is desired that the polymer constituting the polymer coating layer also has a good ability to cover the bonding portion. Therefore, it is preferred that an anionic polymer is employed as the binder. For example, if polyvinylidene difluoride (PVDF) is employed as the binder, since the polyvinylidene difluoride (PVDF) has a negative zeta potential, coating ability of a cationic polymer such as polyethylene imine improves.

Besides, a greater potential difference between the binder and the cationic polymer is more preferred. Therefore, if polyvinylidene difluoride (PVDF) is employed as the binder, it is preferred to employ polyethyleneimine (PEI), which is readily cationized, as the cationic polymer and select a solvent in which polyethyleneimine (PEI) has a zeta potential of +20 mV or more.

The nonaqueous secondary battery of the present invention includes the negative electrode of the present invention, and can employ a known positive electrode and a known electrolytic solution. Any positive electrode can be used as long as it can be used in a nonaqueous secondary battery. The positive electrode includes a current collector and a positive electrode active material layer bonded to the current collector. The positive electrode active material layer contains a positive electrode active material and a binder, and may further contain a conductive assistant. The positive electrode active material, the conductive assistant, and the binder are not particularly limited, and can be anything as long as they can be used in a nonaqueous secondary battery.

When the nonaqueous secondary battery is a lithium ion secondary battery, examples of the positive electrode active material include metallic lithium, $LiCoO_2$, $LiNi_{1/3}Co_{1/3}Mn_{1/3}O_2$, $LiNi_{0.5}Co_{0.2}Mn_{0.3}O_2$, $Li_2MnO_3$, and sulfur. The current collector can be anything generally used for a positive electrode of the lithium ion secondary battery, such as aluminum, nickel, and stainless steel. The conductive assistant and the binder can be the same as those used in the aforementioned negative electrode.

The nonaqueous secondary battery employing the positive electrode and the negative electrode as mentioned above can employ a known electrolytic solution and a known separator which are not particularly limited. When the nonaqueous secondary battery is a lithium ion secondary battery, the electrolytic solution is a solution in which lithium salt as an electrolyte is dissolved in an organic solvent. The electrolytic solution is not particularly limited. As the organic solvent, it is possible to employ an aprotic organic solvent such as at least one selected from propylene carbonate (PC), ethylene carbonate (EC), dimethyl carbonate (DMC), diethyl carbonate (DEC), ethyl methyl carbonate (EMC), and the like. As the electrolyte to be dissolved, it is possible to employ lithium salt which is soluble in an organic solvent, such as $LiPF_6$, $LiBF_4$, $LiAsF_6$, $LiI$, $LiClO_4$, and $LiCF_3SO_3$.

For example, it is possible to use a solution in which lithium salt such as $LiClO_4$, $LiPF_6$, $LiBF_4$ and $LiCF_3SO_3$ is dissolved at a concentration of about 0.5 to 1.7 mol/l in an organic solvent such as ethylene carbonate, dimethyl carbonate, propylene carbonate, and diethyl carbonate. Moreover, one or more additives can be added to the electrolytic solution in order to repair cracks in the negative electrode active material layer caused by repeated expansion and shrinkage in charge and discharge. Among such additives, it is desired to use at least one of fluoroethylene carbonate (FEC), fluorobenzene (FB), vinylene carbonate (VC), vinyl ethylene carbonate (VEC), 1,3-propanesultone (PS), lithium bis(oxalate)borate (LiBOB), and lithium difluoro(oxalate) borate ($LiBF_2(C_2O_4)$). These additives do not have a problem that exhibition of their effects is blocked by presence of the polymer coating layer. That is to say, an effect that makes the electrolytic solution difficult to be decomposed is further reinforced by containing such an additive in the electrolytic solution in addition to employing the negative electrode having the polymer coating layer, battery characteristics can be maintained at an even higher level after repeated charge and discharge.

The separator serves to separate the positive electrode and the negative electrode and hold the electrolytic solution, and can be a thin microporous film of polyethylene, polypropylene or the like. Such a microporous film can be provided with a heat resistant layer mainly comprising an inorganic material. It is preferred to employ aluminum oxide or titanium oxide as the inorganic material.

Shape of the nonaqueous secondary battery of the present invention is not particularly limited and can be selected from a variety of shapes including a cylindrical shape, a multi-layered shape, and a coin shape. Even when the nonaqueous secondary battery of the present invention takes any shape, an electrode assembly is formed by sandwiching the separator with the positive electrode and the negative electrode. Then, the positive electrode current collector and a positive electrode external connection terminal, and the negative electrode current collector and a negative electrode external connection terminal are respectively connected with current collecting leads or the like. Then this electrode assembly is sealed in a battery casing together with an electrolytic solution, thereby forming a battery.

DESCRIPTION OF EMBODIMENTS

Hereinafter, the present invention will be described in detail by way of examples and comparative examples. The following examples, however, only show preferable embodiments of the present invention, and hence, the present invention is not limited to the examples mentioned below.

Example 1

Production of Positive Electrode

A mixed slurry was prepared so as to contain 94 parts by mass of $LiNi_{0.5}Co_{0.2}Mn_{0.3}O_2$ as a positive electrode active material, 3 parts by mass of acetylene black (AB) as a conductive assistant, and 3 parts by mass of polyvinylidene difluoride (PVDF) as a binder. The mixed slurry was applied on a surface of an aluminum foil (a current collector) by using a doctor blade and dried, thereby forming a positive electrode active material layer having a thickness of about 40 μm. Then the aluminum foil having the positive electrode active material layer was dried in vacuum at 120 deg. C. for 12 hours, thereby obtaining a positive electrode.

<Production of Negative Electrode>

First, SiO powder (produced by Sigma-Aldrich Japan, average particle size: 5 μm) was subjected to heat treatment at 900 deg. C. for 2 hours, thereby preparing $SiO_x$ powder having an average particle size of 5 μm. This heat treatment causes homogeneous solid silicon monoxide SiO in which a ratio of S to O is approximately 1 to 1 to be separated into two phases: a Si phase and a $SiO_2$ phase due to an internal reaction in the solid. The Si phase obtained by the separation is very fine.

Then a slurry was prepared by mixing 32 parts by mass of this prepared $SiO_x$ powder, 50 parts by mass of natural graphite, 8 parts by mass of acetylene black (AB) as a conductive assistant, and 10 parts by mass of polyamideimide (PAI) as a binder. This slurry was applied to a surface of an electrolytic copper foil having a thickness of 18 μm by using a doctor blade, thereby producing a negative electrode precursor comprising the copper foil (the current collector) and a negative electrode active material layer formed on the copper foil and having a thickness of about 15 μm.

A cationic polymer solution was prepared by dissolving polyethylene imine (PEI) at a concentration of 1.0% by mass in ethyl alcohol. The aforementioned negative electrode precursor was immersed in this cationic polymer solution at 25 deg. C. for 10 minutes, taken out and air-dried, thereby forming a lower polymer coating layer. On the other hand, an anionic polymer solution was prepared by dissolving polyacrylic acid at a concentration of 0.2% by mass in ethyl alcohol. The negative electrode precursor having the lower polymer coating layer was immersed in this anionic polymer solution at 25 deg. C. for 10 minutes, taken out and air-dried, thereby forming an upper polymer coating layer. This series of operations was repeated twice and dried in vacuum at 120 deg. C. for 12 hours, thereby obtaining a negative electrode having a polymer coating layer.

<Production of Lithium Ion Secondary Battery>

A nonaqueous electrolytic solution was prepared by dissolving 1 mol % of $LiPF_6$ in an organic solvent which was a mixture of ethylene carbonate (EC), ethyl methyl carbonate (EMC) and dimethyl carbonate (DMC) at a volume ratio of 3:3:4.

Then an electrode assembly was produced by sandwiching a microporous polypropylene/polyethylene/polypropylene laminate film having a thickness of 20 μm as a separator with the aforementioned positive electrode and the aforementioned negative electrode. Then this electrode assembly was wrapped with a polypropylene laminate film and its periphery was heat sealed, thereby forming a film-packed battery. Before a last side was heat sealed, the abovementioned nonaqueous electrolytic solution was introduced into the film casing so as to impregnate the electrode assembly, thereby producing a lithium ion secondary battery of the present example.

Example 2

Another lithium ion secondary battery was produced by a similar method to that of Example 1, except for employing a nonaqueous electrolytic solution prepared by further adding 4% by mass of fluoroethylene carbonate (FEC).

Comparative Example 1

Still another lithium ion secondary battery was produced by a similar method to that of Example 1, except for employing a negative electrode which was similar to that of Example 1 but had no polymer coating layer.

Cycle Test

The lithium ion secondary batteries of Examples 1, 2 and Comparative Example 1 were subjected to a cycle test in which one cycle consisted of a 1C constant current charge up to a battery voltage of 4.5 V at 60 deg. C. and a 1C constant current discharge to 2.5 V at 60 deg. C. and was repeated 20 times.

Discharge capacity retention rate of the respective lithium ion secondary batteries after the cycle test was measured and results are shown in FIG. 1. The discharge capacity retention rate is expressed as a percentage of a discharge capacity at a 200th cycle divided by a discharge capacity at a first cycle ((discharge capacity at a 200th cycle)/(discharge capacity at a first cycle)×100)).

The lithium ion second battery of Example 1 had a higher discharge capacity retention rate than that of Comparative Example 1. This is apparently an effect of forming the polymer coating layer. The lithium ion second battery of Example 2 showed a higher discharge capacity retention rate than that of Example 1. It is apparent from this that an addition of fluoroethylene carbonate (FEC) to the electrolytic solution is preferred.

INDUSTRIAL APPLICABILITY

The negative electrode for a nonaqueous secondary battery according to the present invention is applicable to negative electrodes for nonaqueous secondary batteries to be used to drive motors of electric vehicles and hybrid vehicles, or to be used in personal computers, mobile communication equipment, home electric appliances, office equipment, industrial equipment and so on. The nonaqueous secondary battery can be particularly optimally used to drive motors of electric vehicles and hybrid vehicles which require high capacity and high output power.

Although the present invention has been described in detail, it should be understood that the detailed description and specific examples are given by way of illustration only, and various changes and modifications within the spirit and scope of the invention will become apparent to those skilled in the art from this detailed description.

What is claimed is:

1. A negative electrode for a nonaqueous secondary battery, including a current collector and a negative electrode active material layer bonded to the current collector, the negative electrode active material layer including negative electrode active material particles containing silicon oxide ($SiO_x$; $0.5 \leq x \leq 1.6$), a bonding portion for bonding the negative electrode active material particles with each other and bonding the negative electrode active material particles with the current collector, and a polymer coating layer coating at least part of surfaces of at least the negative electrode active material particles, and the polymer coating layer containing a cationic polymer having a positive zeta potential under neutral conditions, wherein the polymer coating layer is formed by alternately depositing a layer of the cationic polymer and a layer of an anionic polymer having a negative zeta potential under neutral conditions, the cationic polymer layer being coated on a side of the negative electrode active material particles.

2. The negative electrode for a nonaqueous secondary battery according to claim 1, wherein the polymer coating layer has a thickness of 10 nm or less.

3. The negative electrode for a nonaqueous secondary battery according to claim 1, wherein the cationic polymer has a zeta potential of +20 mV or more.

4. The negative electrode for a nonaqueous secondary battery according to claim 1, wherein the anionic polymer has a zeta potential of −10 mV or less.

5. A nonaqueous secondary battery including the negative electrode according to claim 1.

6. The nonaqueous secondary battery according to claim 5, having an electrolytic solution containing fluoroethylene carbonate.

* * * * *